Sept. 13, 1949.  J. F. SEBALD ET AL  2,481,882
SIGHT GLASS FLUID FLOW INDICATOR
Filed Nov. 20, 1945
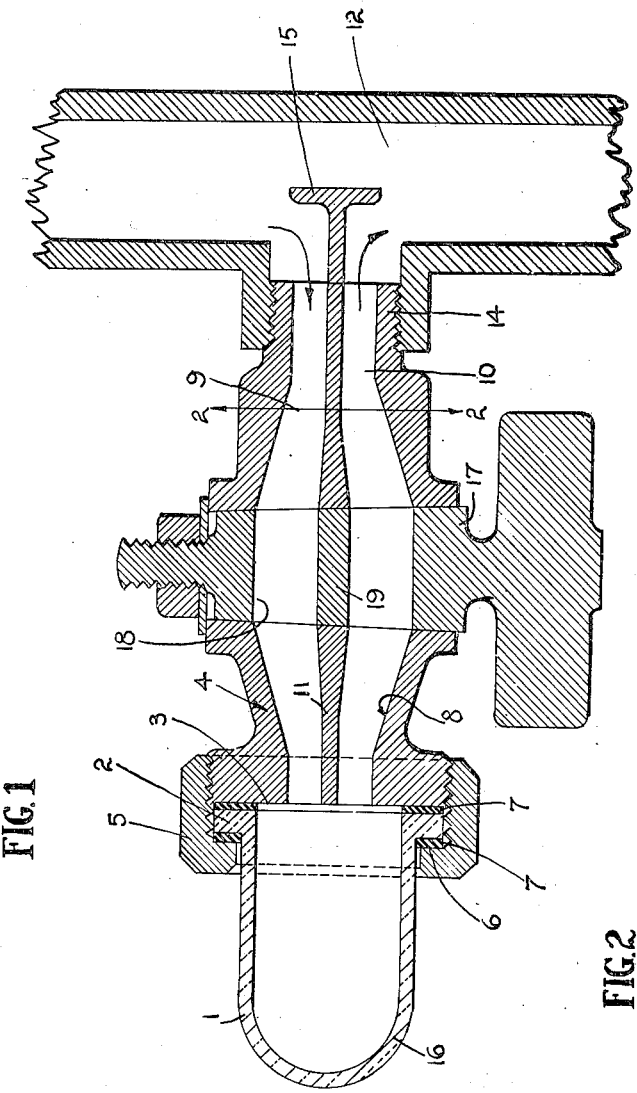
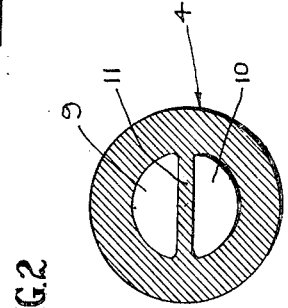
JOSEPH F. SEBALD,
WILLIAM H. DEHAY.
INVENTORS.
BY Robt Meyer
Attorney Patented Sept. 13, 1949

2,481,882

UNITED STATES PATENT OFFICE 2,481,882

SIGHT GLASS FLUID FLOW INDICATOR

Joseph F. Sebald, Bloomfield, N. J., and William H. De Hay, Woodside, N. Y., assignors to Worthington Pump and Machinery Corporation, Harrison, N. J., a corporation of Delaware Application November 20, 1945, Serial No. 629,818

3 Claims. (Cl. 116—117)

This invention relates to sight glasses such as are employed for visioning the flow of liquid through closed lines, in closed containers or the like.

An object of the invention is to provide a sight glass assembly which may be installed in a line or container through which liquid flows under high pressure, and which assembly embodies means whereby the sight glass may be cut out of the line or from connection with the container upon breakage of the glass, or for cleaning without requiring the shutting down of the apparatus with which the sight glass is associated.

More specifically the present invention comprises a sight glass assembly including a coupling embodying means for detachably connecting a sight glass thereto, such sight glass comprising a transparent cylindrical body substantially U-shaped in longitudinal section with its outer end closed and its inner end open to the bore of the coupling. The coupling has a longitudinal partition therein to provide inward flow of liquid into and outward flow of liquid from the sight glass, which partition projects outwardly from the coupling for extending into a liquid flow line with which the sight glass assembly is connected.

A further object of the invention is to provide a plug valve in the coupling by means of which liquid flow to and from the sight glass may be cut off.

With these and other objects in view, as may appear from the accompanying specification, the invention consists of various features of construction and combination of parts, which will be first described in connection with the accompanying drawings, showing a sight glass fluid flow indicator of a preferred form embodying the invention, and the features forming the invention will be specifically pointed out in the claims.

In the drawings:

Figure 1 is a longitudinal section through the improved sight glass assembly; and Figure 2 is a cross section on the line 2—2 of Figure 1.

Referring more particularly to the drawings, the improved sight glass assembly includes the sight glass 1 which is substantially cylindrical in shape and has its outer end closed. A connecting flange 2 is formed upon the inner open end of the sight glass 1, which provides means for connecting the sight glass to the outer open end 3 of the coupling structure 4. A clamp nut 5 is threaded upon the end 3 of the coupling 4 and has a clamping flange 6 formed thereon which serves to clamp the flange 2 against the end of the coupling 4. Suitable gaskets, as indicated at 7, are provided to make a fluid tight connection between the sight glass 1 and the coupling 4. The coupling 4 has a longitudinally extending bore 8 therein which is divided into an inward flow passage 9 and an outward flow passage 10 by a longitudinally extending partition 11. The partition 11 extends diametrically across the bore 8, as clearly shown in Figure 2 of the drawings. The inner end of the coupling 4, that is, the end remote from the end 3, is detachably connected in any suitable manner to a conduit 12 through which liquid flows. While the conduit 12 or liquid-containing means is shown as a pipe in Figure 1 of the drawings, it is to be understood that the improved sight glass assembly may be attached to any suitable type of conduit, receptacle, or container through which liquid flows or which contains a liquid.

The longitudinally extending partition 11 projects beyond the end 14 of the coupling 4 which is connected to the conduit 12 and into the flow path of liquid through the conduit, as clearly shown in Figure 1 of the drawings. A transversely extending liquid flow guiding head 15 is formed on the outer end of the partition 11 so that a part of the liquid flowing through or in the conduit 12 will be guided into the inward flow passage 9 into the sight glass where the outer rounded end 16 of the sight glass will reverse the flow of the liquid and cause it to pass outwardly through the passage 10 back into the conduit or container 12 below the partition 11.

A plug valve 17 is rotatably carried by the coupling 4. The body of the plug valve 17 is provided with a transverse bore 18 through which a diametrically extending partition 19 extends. The partition 19 aligns with the partition 11 and thus the plug valve 17 is provided with two separate openings or passages which communicate respectively with the inflow passage 9 and the outflow passage 10.

In the event the sight glass 1 is broken or becomes clouded or dirty, the plug valve 17 may be rotated to cut off the flow of liquid through the passages 9 and 10 without interferring in any way with the flow of liquid through the conduit 12. The sight glass may then be taken off for cleaning, and if broken, may be replaced with a new one without requiring the shutting down of the apparatus with which the sight glass and coupling are associated.

It will be understood that the invention is not to be limited to the specific construction or arrangement of parts shown, but that they may be widely modified within the invention defined by the claims.

What is claimed is:

1. In a sight glass assembly, the combination with means through which liquid flows, of a sight glass assembly including a coupling having a longitudinal bore therein, a sight glass comprising a transparent substantially cylindrical body having its outer end closed and its inner end open to the bore of the coupling, means for detachably connecting said sight glass to said coupling, a longitudinal partition extending through the bore of said coupling for forming an inflow and an outflow passage for liquid to and from said sight glass, the end of said coupling remote from said sight glass connected to and opening into said first named means, said partition extending beyond the end of the coupling and into the flow path of liquid in said first named means for deflecting part of the liquid through said coupling and sight glass.

2. In a sight glass assembly, the combination with means through which liquid flows, of a sight glass assembly including a coupling having a longitudinal bore therein, a sight glass comprising a transparent substantially cylindrical body having its outer end closed and its inner end open to the bore of the coupling, means for detachably connecting said sight glass to said coupling, a longitudinal partition extending through the bore of said coupling for forming an inflow and an outflow passage for liquid to and from said sight glass, the end of said coupling remote from said sight glass connected to and opening into said first named means, said partition extending beyond the end of the coupling and into the flow path of liquid in said first named means for deflecting part of the liquid through said coupling and sight glass, and a transversely extending liquid flow guide formed upon the projecting end of said partition.

3. In a sight glass assembly, the combination with means through which liquid flows, of a sight glass assembly including a coupling having a longitudinal bore therein, a sight glass comprising a transparent substantially cylindrical body having its outer end closed and its inner end open to the bore of the coupling, means for detachably connecting said sight glass to said coupling, a longitudinal partition extending through the bore of said coupling for forming an inflow and an outflow passage for liquid to and from said sight glass, the end of said coupling remote from said sight glass connected to and opening into said first named means, said partition extending beyond the end of the coupling and into the flow path of liquid in said first named means for deflecting part of the liquid through said coupling and sight glass, a plug valve carried by said coupling for controlling the flow of liquid to and from said sight glass, said plug valve provided with a transverse opening, and a partition extending through said opening and aligning with the partition in the bore of the coupling.

JOSEPH F. SEBALD.
WILLIAM H. DE HAY.

REFERENCES CITED

The following references are of record in the file of this patent:

UNITED STATES PATENTS

| Number | Name | Date |
|---|---|---|
| 515,037 | Ashley | Feb. 20, 1894 |
| 572,724 | Rumely | Dec. 8, 1896 |
| 762,485 | Metcalf et al. | June 14, 1904 |
| 817,470 | Cole | Apr. 10, 1906 |
| 942,139 | Green | Dec. 7, 1909 |
| 1,093,229 | Wilkinson | Apr. 14, 1914 |
| 1,110,023 | Wilkinson | Sept. 8, 1914 |
| 1,257,824 | Ebert | Feb. 26, 1918 |
| 2,145,304 | Hill | Jan. 31, 1939 |

FOREIGN PATENTS

| Number | Country | Date |
|---|---|---|
| 189,322 | Great Britain | Nov. 30, 1922 |
| 259,398 | Italy | June 23, 1928 |